United States Patent Office 2,907,730
Patented Oct. 6, 1959

2,907,730

DIPHENOLIC ACID, EPOXIDE COMPOSITIONS

Sylvan Owen Greenlee, West Lafayette, Ind., assignor to S. C. Johnson & Son, Inc., Racine, Wis.

No Drawing. Application September 19, 1958
Serial No. 761,923

10 Claims. (Cl. 260—19)

THE INVENTION AND OBJECTS IN GENERAL

The invention relates to new compositions resulting from the reaction of polyepoxides and diphenol carboxylic acids and/or said compositions modified with aldehyde condensates in regulated proportions to give valuable materials useful in the manufacture of moldings, adhesives, films, etc. The epoxides used in making the new compositions contain an average of more than one epoxide group per molecule and are free from functional groups or other than epoxide, carboxyl, and hydroxyl groups. The diphenol carboxylic acids are acids having an aliphatic-aromatic structure and containing hydroxyl groups in addition to the carboxyl group. The aldehyde condensate modifiers are fusible materials having free reactive sites. The invention includes the initial reaction mixtures as well as the intermediate and final reaction products derived therefrom.

An object of this invention is the production of new compositions from epoxides and diphenol carboxylic acids and said compositions modified with aldehyde condensates to form resins, varnishes, molding compositions, adhesives, etc.

Another object of this invention is the production of intermediate reaction products from the initial reaction mixtures of epoxides and diphenol carboxylic acids and said compositions modified with aldehyde condensates which are capable of further reaction on the application of heat to form insoluble, infusible products.

Another object of this invention is the production of new admixtures of the materials set-forth hereinabove which are stable at ordinary temperatures for relatively long periods of time, yet which may be polymerized into insoluble, infusible products with or without the addition of catalysts by the application of heat.

These and other objects and advantages will appear from the following more detailed description, with particular reference to specific examples which are to be considered as illustrative only.

In general the polyepoxides contemplated for use herein are compounds containing an average of more than one and up to about 20 epoxide groups per molecule. Epoxide groups for the purpose of this specification refer to groups wherein the epoxy oxygen bridges adjacent carbon atoms. Such compositions, free from functional groups other than epoxide, carboxyl and hydroxyl groups, are reactive with active hydrogen containing groups including the phenolic and carboxyl groups supplied by the contemplated diphenol carboxylic acids. Typical epoxides which have been found to be operable are complex resinous polyepoxides, resinous polyepoxide polyesters, epoxidized natural oils and aliphatic polyepoxides.

The diphenol carboxylic acids contemplated for use herein are the 4,4 bis(hydroxyaryl) pentanoic acids and their equivalent, exemplified by 4,4 bis(4-hydroxyphenyl) pentanoic acid.

The aldehyde condensates are prepared from low molecular weight aldehydes and ammonia derivatives capable of being condensed with an aldehyde or from low molecular weight aldehydes and phenols capable of being condensed with an aldehyde. It is necessary that the condensate remain soluble and fusible as well as contain reactive methanol groups or an active hydrogen atom attached to some other function group.

The compositions of the instant invention are prepared by reacting an epoxide with a diphenol carboxylic acid and if desired modifying said composition with the before-mentioned aldehyde condensates usually in the presence of heat. Having generally described and set forth the objects of the invention, a more detailed description of operable components and reaction conditions will be given.

OPERABLE DIPHENOL CARBOXYLIC ACIDS

The diphenol carboxylic acids contemplated for use herein must have two hydroxyaryl groups attached to a single carbon atom. The preparation of such an aryloxy acid is most conveniently carried out by condensing a keto acid with the desired phenol. To the best of applicant's knowledge, any keto acid or ester is operable in which a keto group is connected to a carboxy or carboalkoxy radical through an alkylene radical of at least 2 cabon atoms; however, experience in the preparation of bisphenol and related compounds indicates that the carbonyl group of the keto acid should be positioned next to a terminal methyl group in order to obtain satisfactory yields. Further, while a broad class of acids is contemplated such as the keto substituted pentanoic, hexanoic and heptanoic acids, the pentanoic acid, levulinic acid, is preferred since it is readily available.

Prior copending applications, Serial Nos. 464,607 and 489,300 filed October 25, 1954, and February 18, 1955, respectively, disclose a number of illustrative compounds suitable for use as the diphenol carboxylic acid and methods of preparing the same. These materials which are referred to for convenience as diphenol carboxylic acids or by the trade name DPA, consist of the condensation products of levulinic acid and phenol, substituted phenols or mixtures thereof. It is to be understood that the phenolic nuclei of the diphenol carboxylic acids may be substituted witht any group which will not interfere with the reactions contemplated herein. Such groups are the halo, nitro and alkyl groups of 1 to 5 carbon atoms. The chloro and bromo phenols are the preferred halogenated materials although it is possible under proper conditions to condense fluoro substituted phenols with a keto acid. Diphenol carboxylic acids derived from substituted phenols such as the alkylated phenols are sometimes more desirable than the products obtained from unsubstituted phenols due to properties impartred by the substituted groups. For instance, the alkyl groups provide better solubility in selected solvents, flexibility and water resistance. However, the unsubstituted product is usually more readily purified. In the before mentioned condensation reaction between the phenol and keto acid it has been found, as one would expect, that the reaction occurs so that the phenolic hydroxyl group of the diphenol carboxylic acid is in a position para or ortho to the point of attachment of the hydroxyaryl radical to the pentanoic acid. Very little or no condensation occurs at the meta position.

Examples 1 to 4 inclusive, illustrate the preparation of typical diphenol carboxylic acids. However, it should be understood that the invention is not intended to be limited thereby. Proportions expressed are parts by weight unless otherwise indicated. Acid values as used herein represent the number of milligrams of KOH required to neutralize a one gram sample.

*Example 1*

A mixture consisting of 376 parts of phenol, 116 parts of levulinic acid, and 250 parts of 37% aqueous hydrochloric acid was agitated at 48°–52° C. for 66 hours. The top layer was removed from the aqueous hydrochloric acid layer by decantation. The product was then purified by vacuum distillation of the volatile unreacted materials by heating to 180° C. at 32 mm. pressure. The residual product amounted to 247 parts (86.5% theoretical) and had a softening point of 80° C. and an acid value of 155. Purification of this product by dissolving in an aqueous bicarbonate solution, reprecipitating with mineral acid, followed by recrystallization from hot water gave a white crystalline compound melting at 171°–172° C. with an acid value of 196.

Softening points as used herein were run by Durrans' Mercury Method (Journal of Oil and Colour Chemists Association, 12, 173–5, 1929).

*Example 2*

240.5 grams (2.18 mols) ortho cresol, 156 grams (37%) HCl, and 145 grams levulinic acid were charged to a 2-liter round bottom flask equipped with thermometer, reflux condenser and mechanical agitator. The temperature was raised to 50° C. in approximately 1 hour and held in this range for an additional 72 hours. The recovered material was washed 6 times with boiling water before steam distilling. The resultant crude material had an acid value of 156, a saponification No. of 206 and was recovered at 74% of theoretical based on levulinic acid.

This crude material was refluxed with aqueous sodium hydroxide for approximately 1 hour and the material re-acidified, washed and filtered. The material was recrystallized from hot benzene and dried in a vacuum oven. The resultant material had an acid value of 169, theoretical 178, saponification value of 175, theoretical 178 and a melting point of 149–150° C.

*Example 3*

363 parts of the ethyl ester of 4,4-bis(4-hydroxyphenyl) pentanoic acid prepared as in Example 1 and 344 parts of sulfonyl chloride were charged to a 3 necked flask equipped with thermometer, reflux condenser, and mechanical stirrer. The reaction immediately exothermed and was cooled with a water bath maintaining the temperature at approximately 25° C. for 1 hour. The reaction charge became thick and then solidified with a pronounced temperature rise. The reaction mixture had a yellow color. Excess sulfonyl chloride was removed under slight pressure. The obtained ester had a chlorine content of 21.38% corresponding to the addition of approximately 2 chlorine atoms (theoretical equals 18.5%). The chlorinated ester was saponified to obtain the corresponding acid.

*Example 4*

172 parts DPA prepared as in Example 1 and 450 parts glacial acetic acid were charged to a 3 necked flask equipped with a thermometer, reflux condenser, and mechanical stirrer. The resultant solution was tan in color. 264 parts of benzene were added to the charge before cooling to 0° C. in an ice bath. At this temperature, drop-wise addition of 85.8 parts 70% nitric acid diluted with 66 parts of glacial acetic acid was begun. The complete addition required 3 hours and 45 minutes with the reaction temperature never exceeding 0° C. The reaction charge at the end of the addition was a clear dark reddish solution. The charge was allowed to stir at temperatures between 5 and 20° C. for approximately 12 hours. At the end of this time, a heavy orange precipitate had formed. The precipitate was filtered and washed 3 times with distilled water before it was vacuum dried. The resultant crude material recovered at 84.5% of theoretical, had an acid value of 488 (theoretical=447) and a melting point of 102–4° C. The crude material was recrystallized from a mixture of hot ethanol and water to give a fine yellow crystalline material having a melting point of 137.5–140° C., a nitrogen content of 7.20% (theoretical equal 7.44%) and an acid value of 445.

Additional operable diphenol carboxylic acids include acids containing chloro, bromo, nitro and alkyl groups of 1 to 5 carbon atoms exemplified by 4,4-bis(4-hydroxy-3-ethyl phenyl)-pentanoic acid, 4,4-bis(4-hydroxy-3,5-isopropyl phenyl)-pentanoic acid, 4,4-bis(4-hydroxy-2-ethyl phenyl)-pentanoic acid, 4,4-bis(2-hydroxy-4-butyl phenyl)-pentanoic acid, 4,4-bis(4-hydroxy-2,5-diamyl phenyl)-pentanoic acid, 4,4-bis(4-hydroxy-3-nitro phenyl)-pentanoic acid, 4,4-bis(2-hydroxy-3-nitro-phenyl)-pentanoic acid, 4,4-bis(4-hydroxy-3-methyl phenyl) pentanoic acid, 4,4-bis(4-hydroxy-3-amyl phenyl)-pentanoic acid, 4,4-bis(4-hydroxy-3-chloro phenyl)-pentanoic acid, 4-(4-hydroxyphenyl)4-(4-hydroxy-3-amyl phenyl)-pentanoic acid, 4-(4-hydroxyphenyl)-4-(2-hydroxy-4-chlorophenyl)-pentanoic acid, 4-(4-hydroxyphenyl)-4-(4-hydroxy-3,5-dibromo phenyl)-pentanoic acid, 4-(4-hydroxyphenyl)-4-(2-hydroxy-4-nitro phenyl)-pentanoic acid, 4-(4-hydroxyphenyl)-4-(4-hydroxy-3-sulfo phenyl)-pentanoic acid, 4-(4-hydroxyphenyl)-4-(2-hydroxy-3,5-dimethyl phenyl)-pentanoic acid, 4,4-bis(2-hydroxy-4-butyl phenyl)-pentanoic acid, 4,4-bis(2-hydroxy-5 methyl-3 chloro phenyl) pentanoic acid, 4,4-bis(4-hydroxy-3,5-dibromo phenyl)-pentanoic acid, 4,4-bis(4-hydroxy-3,5-dinitro phenyl)-pentanoic acid, 4,4-bis(2-hydroxy-3 nitro-5 methyl phenyl) pentanoic acid, 4,4-bis(4-hydroxy-3-methyl-5 chloro phenyl)-pentanoic acid, 5,5-bis(4-hydroxy phenyl)-hexanoic acid, 5,5-bis(4-hydroxy-3-methyl phenyl)-hexanoic acid, 5,5-bis(4-hydroxy-3-nitro phenyl)-hexanoic acid, and 5,5-bis(4-hydroxy-3-chloro phenyl)-hexanoic acid.

OPERABLE EPOXIDES

Illustrative of the epoxide compositions which may be employed in this invention are the complex epoxide resins which are polyether derivatives of polyhydric phenols with such polyfunctional coupling agents as polyhalohydrins, polyepoxides, or epihalohydrins. These compositions may be described as polymeric polyhydric alcohols having alternating aliphatic chains and nuclei connected to each other by ether linkages, containing terminal epoxide groups and free from functional groups other than epoxide and hydroxyl groups. It should be understood that significant amounts of the monomeric reaction products are often present. This would be illustrated by I to III below where *n* equals zero. Preparation of these epoxide materials as well as illustrative examples are described in U.S. Patents 2,456,408, 2,503,-726, 2,615,007, 2,615,008, 2,668,807, 2,688,805 and 2,698,315. Well-known commercial examples of these resins are the Epon resins marketed by the Shell Chemical Corporation. Illustrative of the preparation of these epoxide resins are the following reactions wherein the difunctional coupling agent is used in varying molar excessive amounts:

Polyhydric phenol and an epihalohydrin bis(hydroxyphenyl)isopropylidene + excess epichlorohydrin $$\underset{\text{alkali}}{\xrightarrow{\text{aqueous}}}$$

[structure I: CH₂CHCH₂—O—[ring—C(CH₃)₂—ring—O—CH₂CHOHCH₂—]ₙ—O—ring—C(CH₃)₂—ring—O—CH₂CHCH₂ with terminal epoxides]   I Polyhydric phenol and a polyepoxide bis(hydroxyphenyl)isopropylidene + excess butylene dioxide $$\xrightarrow{\text{heat}}$$

[structure II: CH₂CHCHOHCH₂—O—[ring—C(CH₃)₂—ring—O—CH₂CHOHCHOHCH₂—]ₙ—O—ring—C(CH₃)₂—ring—O—CH₂CHOHCHCH₂ with terminal epoxides]   II Polyhydric phenol and a polyhalohydrin bis(hydroxyphenyl)isopropylidene + excess alpha-glycerol dichlorohydrin $$\underset{\text{alkali}}{\xrightarrow{\text{aqueous}}}$$

[structure III: CH₂CHCH₂—O—[ring—C(CH₃)₂—ring—O—CH₂CHOHCH₂—]ₙ—O—ring—C(CH₃)₂—ring—O—CH₂CHCH₂ with terminal epoxides]   III As used in the above formulas, $n$ indicates the degree of polymerization depending on the molar ratio of reactants. As can be seen from these formulas, the complex epoxide resins used in this invention contain terminal epoxide groups and alcoholic hydroxyl groups attached to the aliphatic portions of the resin, the latter being formed by the splitting of epoxide groups in the reaction of the same with phenolic hydroxyl groups. Ultimately, the reaction with the phenolic hydroxyl groups of the polyhydric phenols is generally accomplished by means of epoxide groups formed from halohydrins by the loss of hydrogen and halogen as shown by the following equation:

$$-\text{CHOHCH}_2\text{Cl} \longrightarrow -\overset{O}{\overset{|}{\text{CH}}-\text{CH}_2} + \text{HCl} \qquad \text{IV}$$

Other epoxide compositions which may be used include the polyepoxide polyesters which may be prepared by esterifying tetrahydrophthalic anhydride with a glycol and epoxidizing the product of the esterification reaction. In the preparation of the polyesters, tetrahydrophthalic acid may also be used as well as the simple esters of tetrahydrophthalic acid such as dimethyl and diethyl esters. There is a tendency with tertiary glycols for dehydration to occur under the conditions used for esterification so that generally the primary and secondary glycols are the most satisfactory in the polyester formation. Glycols which may be used in the preparation of this polyester composition comprise, in general, those glycols having 2 hydroxyl groups attached to separate carbon atoms and free from functional groups which would interfere with the esterification or epoxidation reactions. These glycols include such glycols as ethylene glycol, diethylene glycol, triethylene glycol, tetramethylene glycol, propylene glycol, polyethylene glycol, neopentyl glycol, and hexamethylene glycol. Polyepoxide polyesters may be prepared from these polyesters by epoxidizing the unsaturated portions of the tetrahydrophthalic acid residues in the polyester composition. By properly proportioning reactants in the polyester formation and regulating the epoxidation reaction, polyepoxides having up to 12 or more epoxide groups per molecule may be readily prepared. These polyepoxide polyester compositions as well as their preparation are more fully described in a copending application having Serial No. 503,323, filed April 22, 1955, now abandoned.

Polyepoxide compositions useful in this invention also include the epoxidized unsaturated natural oil acid esters, including the unsaturated vegetable, animal, and fish oil acid esters made by reacting these materials with various oxidizing agents. These unsaturated oil acid esters are long chain aliphatic acid esters containing from about 15 to 22 carbon atoms. These acids may be esterified by simple monohydric alcohols such as methyl, ethyl, or decyl alcohol, by polyhydric alcohols such as glycerol, pentaerythritol, polyallyl alcohol, or resinous polyhydric alcohols. Also suitable are the mixed esters of polycarboxylic acids and long chain unsaturated natural oil acids with polyhydric alcohols, such as glycerol and pentaerythritol. These epoxidized oil acid esters may contain more than 1 up to 20 epoxide groups per molecule. The method of epoxidizing these unsaturated oil acid esters consists of treating them with various oxidizing agents, such as the organic peroxides and the peroxy acids, or with one of the various forms of hydrogen peroxide. A typical procedure practiced in the art consists of using hydrogen peroxide in the presence of an organic acid, such as acetic acid and a catalytic material, such as sulfuric acid. More recently epoxidation methods have consisted of replacing the mineral acid catalyst with a sulfonated cation exchange material, such as the sulfonated copolymer of styrene divinylbenzene.

The epoxide compositions which may be used in preparing the compositions of this invention also include aliphatic polyepoxides which may be illustrated by the products obtained by polymerizing allyl glycidyl ether through its unsaturated portion. In the polymerization of these ethers there is probably some polymerization occurring through the epoxide groups, and in addition some splitting of the epoxide groups to form hydroxyl groups so that pure compounds are not usually obtained.

Other aliphatic polyepoxides useful in this invention may be illustrated by the poly(epoxyalkyl) ethers derived from polyhydric alcohols. These materials may, in general, be prepared by reacting an aliphatic polyhydric alcohol with an epihalohydrin in the presence of a suitable catalyst and in turn dehydrohalogenating the product to produce the epoxide composition. The production of these epoxides may be illustrated by the reaction of glycerol with epichlorohydrin in the presence of boron trifluoride followed by dehydrohalogenation with sodium aluminate as follows:

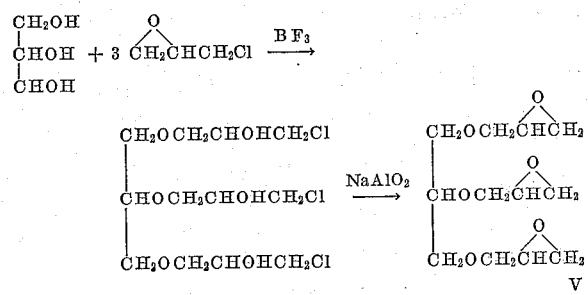

It is to be understood that such reactions do not give pure compounds and that the halohydrins formed and the epoxides derived therefrom are of somewhat varied character depending upon the particular reactants, their proportions, reaction time and temperature. In addition to epoxide groups, the epoxide compositions may be characterized by the presence of hydroxyl groups and halogens. Dehydrohalogenation affects only those hydroxyl groups and halogens which are attached to adjacent carbon atoms. Some halogens may not be removed in this step in the event that the proximate carbinol group has been destroyed by reaction with an epoxide group. These halogens are relatively unreactive and are not to be considered as functional groups in the conversion of the reaction mixture of this invention. The preparation of a large number of these mixed polyepoxides is described in the Zech patents, U.S. 2,538,072, 2,581,464, and 2,712,000. Still other polyepoxides which have been found to be valuable are such epoxide compositions as diepoxy butane, diglycid ether, and epoxidized polybutadiene.

Immediately following will be a description or illustration of preparations of polyepoxides which will be used in examples of compositions of this invention.

The complex resinous polyepoxides used in the examples and illustrative of the commercially prepared products of this type are the Epon resins marketed by Shell Chemical Corporation. The following table gives the properties of some Epon resins which are prepared by the condensation in the presence of alkali of bis(4-hydroxyphenyl) isopropylidene with a molar excess of epichlorohydrin in varying amounts.

| Epon resin type | Melting point, °C. | Viscosity [1] (Gardner-Holdt) | Epoxide equivalent | Average molecular weight |
|---|---|---|---|---|
| Epon 864 | 40–45 | A₁–B | 325 | 450 |
| Epon 1001 | 64–76 | C–G | 480 | 640 |
| Epon 1004 | 95–105 | Q–U | 870 | 1,133 |
| Epon 1007 | 127–133 | Y–Z₁ | 1,750 | |
| Epon 1009 | 145–155 | Z₂–Z₃ | 3,200 | |

[1] Based on 40% nonvolatile in butyl Carbitol at 25° C.

Examples 5 through 7 describe the preparation of typical polyepoxide polyesters.

*Example 5*

PREPARATION OF POLYESTER FROM TETRAHYDROPHTHALIC ANHYDRIDE AND ETHYLENE GLYCOL

In a 3-necked flask provided with a thermometer, mechanical agitator, and a reflux condenser attached through a water trap was placed a mixture of 3 mols of tetrahydrophthalic anhydride and 2 mols of n-butanol. After melting the tetrahydrophthalic anhydride in the presence of the butanol, 2 mols of ethylene glycol were added. The reaction mixture was gradually heated with agitation to 225° C. at which point a sufficient amount of xylene was added to give refluxing at esterification temperature. The reaction mixture was then heated with continuous agitation at 225–235° C. until an acid value of 4.2 was obtained. This product gave an iodine value of 128.

EPOXIDATION OF THE POLYESTER RESIN

In a 3-necked flask provided with a thermometer, a mechanical agitator, and a reflux condenser was placed 107 parts of the dehydrated acid form of a cation exchange resin (Dowex 50 X–8, 50–100 mesh, Dow Chemical Company, a sulfonated styrenedivinylbenzene copolymer containing about 8% divinylbenzene, the percent divinylbenzene serving to control the amount of crosslinkage. The Dowex resins are discussed in publications entitled "Ion Exchange Resins No. 1" and "Ion Exchange Resins No. 2," copyright 1954 by Dow Chemical Company, the publications having form number Sp32–254 and Sp31–354, respectively) and 30 parts glacial acetic acid. The mixture of cation exchange resin and acetic acid was allowed to stand until the resin had completely taken up the acid. To this mixture was added 200 parts of the polyester resin dissolved in an equal weight of xylene. To the continuously agitated reaction mixture was added dropwise over a period of 45 minutes to 1 hour, 75 parts of 50% hydrogen peroxide. The reaction temperature was held at 60° C. requiring the application of some external heat. (In some preparations involving other polyester resins, sufficient exothermic heat is produced during the addition of hydrogen peroxide so that no external heat is required, or even some external cooling may be required.) The reaction was continued at 60° C. until a milliliter sample of the reaction mixture analyzed less than 1 milliliter of 0.1 N sodium thiosulfate in an iodometric determination of hydrogen peroxide. The product was then filtered, finally pressing the cation exchange resin filter cake. The acid value of the total resin solution was 42. The percent non-volatile of this solution amounting to 400 parts was 50. This 400 parts of solution was thoroughly mixed with 110 parts of the dehydrated basic form of Dowex 1 (an anion exchange resin of the quaternary ammonium type. Dowex 1 is a styrenedivinylbenzene copolymer illustrated by the formula RR′₃N⁺OH— where R represents the styrenedivinylbenzene matrix and R′ is a methyl group, manufactured by the Dow Chemical Company). The resulting mixture was then filtered followed by pressing as much of the solution as possible from the anion exchange resin cake. This product had an acid value of 4.5 and an epoxide equivalent of 288 based on a nonvolatile resin content of 42.0%. The epoxide values as discussed herein were determined by refluxing for 30 minutes a 2-gram sample with 50 milliliters of pyridine hydrochloride in excess pyridine. (The pyridine hydrochloride solution was prepared by adding 20 milliliters of concentrated HCl to a liter of pyridine.) After cooling to room temperature, the sample is then back-titrated with standard alcoholic sodium hydroxide.

*Example 6*

Following the procedure of Example 5, a polyester resin was prepared from 5 mols of tetrahydrophthalic anhydride, 4 mols of diethylene glycol, and 2 mols of n-butanol. This product had an acid value of 5.3 and an iodine value of 107. This polyester resin was epoxidized in the manner previously described to give an epoxide equivalent weight of 371 on the nonvolatile content. The nonvolatile content of this resin solution as prepared was 40.2%.

Example 7

The process of Example 5 was followed to obtain a polyester resin from 1.1 mols of tetrahydrophthalic anhydride, 1 mol of 1,4-butanediol and 0.2 mol of n-butanol. The product had an acid value of 8.6. This polyester resin was epoxidized in the same manner to give an epoxide equivalent weight of 292 and an acid value of 5.2 on the nonvolatile content. The nonvolatile content of this resin solution was 41.9%.

Example 8 describes the preparation of an epoxidized vegetable oil acid ester.

Example 8

Admex 710, an epoxidized soyabean oil having an equivalent weight to an epoxide of 263, was dissolved in methyl ethyl ketone to a nonvolatile content of 50%. Admex 710, a product of the Archer-Daniels-Midland Company, has an acid value of 1, a viscosity of 3.3 strokes at 25° C. and an average molecular weight of 937.

Examples 9 and 10 describe the preparation of aliphatic polyepoxides.

Example 9

In a reaction vessel provided with a mechanical stirrer and external cooling means was placed 276 parts of glycerol and 828 parts of epichlorohydrin. To this reaction mixture was added 1 part of 45% boron trifluoride ether solution diluted with 9 parts of ether. The reaction mixture was agitated continuously. The temperature rose to 50° C. over a period of 1 hour and 45 minutes at which time external cooling with ice water was applied. The temperature was held between 50 and 75° C. for 1 hour and 20 minutes. To 370 parts of this product in a reaction vessel provided with a mechanical agitator and a reflux condenser was added 900 parts of dioxane and 300 parts of powdered sodium aluminate. With continuous agitation this reaction mixture was gradually heated to 92° C. over a period of 1 hour and 50 minutes, and held at this temperature for 8 hours and 50 minutes. After cooling to room temperature, the inorganic material was removed by filtration. The dioxane and low boiling products were removed by heating the filtrate to 205° C. at 20 mm. pressure to give a pale yellow product. The epoxide equivalent of this product was determined by treating a 1-gram sample with an excess of pyridine containing pyridine hydrochloride (made by adding 20 cc. of concentrated hydrochloric acid per liter of pyridine) at the boiling point for 20 minutes and back-titrating the excess pyridine hydrochloride with 0.1N sodium hydroxide using phenolphthalein as indicator and considering one HCl as equivalent to one epoxide group. The epoxide equivalent on this product was found to be 152.

Example 10

In a 3-necked flask provided with a thermometer, a mechanical agitator, a reflux condenser and a dropping funnel was placed 402 parts of allyl glycidyl ether. With continuous agitation the temperature was raised to 160° C. at which time one part of a solution of methyl ethyl ketone peroxide, dissolved in diethyl phthalate to a 60% content, was added. The temperature was held at 160–165° C. for a period of 8 hours, adding one part of the methyl ethyl ketone peroxide solution each 5 minutes during this 8-hour period. After the reaction mixture had stood overnight, the volatile ingredients were removed by vacuum distillation. The distillation was started at 19 mm. pressure and a pot temperature of 26° C. and volatile material finally removed at a pressure of 3 mm. and a pot temperature of 50° C. The residual product had a molecular weight of 418, and equivalent weight to epoxide content of 198, the yield amounting to 250 parts.

OPERABLE ALDEHYDE CONDENSATES

Two general classes of aldehyde condensates are contemplated for preparing the modified products of this invention, those prepared from ammonia derivatives and those derived from phenols, with the choice being dependent on the end uses and characteristics desired. For instance, if the end use were to be a white enamel, the ammonia derivative-aldehyde condensates would probably be chosen because of their extremely light initial color and their good color retention. The phenols are somewhat darker in color and have a tendency to yellow upon aging. For the most desirable non-polar solvent solubility, the phenol-aldehyde condensates would be the proper choice since the ammonia derivative-aldehyde condensates usually require some butanol and xylol present to give the desirable solubility. For certain applications, the butanol odor is objectionable and at times butanol is incompatible with other resins which are used. Adhesion to metals also appears to be better in the phenol-aldehyde condensates. From an economic standpoint, the phenol-aldehyde condensates are advantageous, being lower in price.

The aldehyde-ammonia derivatives condensation products are formed by the reaction of aldehydes with amines or amides such as urea, thiourea, and their derivatives, melamines and sulfonamides. It is necessary that the ammonia derivative contain at least one >NH group. Thus nitriles and tertiary amines which are also considered ammonia derivatives are excluded. Otherwise the definition reads on amides and primary and secondary amines. It is well known that such materials including a number of their derivatives react with formaldehyde to form aldehyde-amine or aldehyde-amide condensates. Exemplary derivatives are substituted urea, thiourea, or melamine such as the long-chain alkyl-substituted materials which impart oil or organic solvent solubility. Suitable sulfonamides include aromatic mononuclear sulfonamides such as toluene sulfonamide, polynuclear sulfonamides such as naphthalene sulfonamide, sulfonamides of aromatic polynuclear ethers and mono- or polyfunctional sulfonamides. In addition to melamine, other operable ammonia derivatives containing the azide bridge are the amino di- and triazines.

In the condensation of aldehydes with the organic ammonia derivatives, initially the reaction appears to be the addition of aldehyde to the organic ammonia derivative to form primarily intermediate alkylol compounds. These compounds will further condense to form more resinous materials, combining with each other through alkylene bridges formed between the nitrogen atoms of the compounds.

In the alkylol condensate and in the more condensed products of an advanced stage of condensation, there are hydrogen atoms present in the hydroxyl groups which have been formed in the production of the alkylol condensate and which have not been destroyed by further condensation. There are also an appreciable number of hydrogen atoms attached to nitrogen atoms of the amide or amine groups present in the condensation products. These hydrogens contained in the hydroxyl groups and the amide or amine groups are active with respect to epoxide groups and will react therewith in the reaction mixtures of this invention to form complex, crosslinked products.

In general, the condensation products of ammonia derivatives and aldehydes contemplated herein are partial and intermediate reaction or condensation products of aldehydes, particularly formaldehyde, with amines or amides, or mixtures thereof. The reactions which produce such condensation products involve the removal of amino or amido hydrogen atoms from the ammonia derivative. Therefore, it should be understood that an ammonia derivative as stated hereinbefore, in order to be suitable for condensation with an aldehyde, must contain at least one hydrogen atom attached to the nitrogen atom. Fusible materials of varying degrees of condensation may be used with the epoxies and the diphenol carboxylic acids to form the new compositions and reaction products of this invention. Thus, the condensates may be made by various processes known in the art for the manufacture of aldehyde-ammonia derivative resins, resulting in water-soluble, alcohol-soluble or oil-soluble types.

For use herein, the aldehyde-ammonia derivative condensate may be in its monomeric form which is essentially an alkylol or polyalkylol product or it may be highly condensed. It is suitable as long as it is still fusible and is soluble in or compatible with the epoxide composition and the diphenol carboxylic acid composition with which it is to be reacted.

Many of the commercial products derived from the reaction of urea, thiourea, or melamine with formaldehyde are mixed products made by reacting the formaldehyde with mixtures of these materials. Such composite or mixed reaction products can advantageously be used for reaction with the epoxies and the diphenol carboxylic acids according to the present invention. In addition, many of the present day commercial resins derived from aldehydes and urea, thiourea, or melamine, or a mixture thereof, are prepared in the presence of alcoholic or other solvents which take part in the reaction and become an integral part of the resulting resin composition. This is illustrated by the products prepared in the presence of butyl alcohol in which case the butyl alcohol to some extent condenses with the alkylol groups of the aldehyde condensate to give butyl ether residues as a part of the final composition. Such modified products are also suitable. In some cases it may be desirable to use an ammonia derivative-aldehyde condensate which is completely soluble in a common solvent or a mixture of solvents used to dissolve the epoxide and the diphenol carboxylic acid. Solutions prepared in this manner can be applied as a coating and the solvent subsequently evaporated before the main reaction between the epoxide, diphenol carboxylic acid and condensate takes place.

Examples 11 to 15, inclusive, describe the preparation of typical ammonia derivative-aldehyde condensates suitable for use herein.

*Example 11*

In a 3-liter 3-neck flask provided with a mechanical agitator, a thermometer, and reflux condenser was placed 120 parts of urea, 600 parts of 37% aqueous formaldehyde, and 1040 parts of n-butyl alcohol. With continuous agitation the reaction mixture was heated to reflux temperature and the refluxing continued for a period of 1 hour. At this point a water trap was placed between the reflux condenser and flask and filled with toluene. Distillation was continued until 315 parts of water were removed from the reaction mixture. The resulting mixture was cooled to room temperature, filtered, and 1030 parts of a clear, water-white syrupy liquid isolated.

*Example 12*

The procedure of preparation including the water removal was the same as that used in Example 11. A mixture of 304 parts of thiourea, 960 parts of 37% aqueous formaldehyde, and 800 parts of n-butyl alcohol was used to give a final yield of 1214 parts of a clear, light amber, syrupy product.

*Example 13*

The procedure of preparation including the removal of water was the same as that used in Example 11. A mixture of 120 parts of urea, 148 parts of thiourea, 950 parts of 37% aqueous formaldehyde, and 800 parts of n-butyl alcohol was used to give a final yield of 1175 parts of a clear, almost colorless, syrupy liquid.

*Example 14*

In a 3-liter 3-neck flask provided with a mechanical agitator, a thermometer, and a reflux condenser was placed 378 parts of melamine, 840 parts of 37% aqueous formaldehyde, and 725 parts of n-butyl alcohol. With continuous agitation the reaction mixture was heated to reflux temperature and the refluxing continued for a period of 30 minutes. At this point a water trap was placed in the distilling column between the flask and the reflux condenser and filled with toluene. The refluxing was continued until a total of 590 parts of water had been removed from the reaction mixture. The product amounting to 1342 parts was a clear, water-white, heavy, syrupy liquid.

*Example 15*

In a 3-liter 3-neck flask provided with a mechanical agitator, a thermometer, and a reflux condenser was placed 1370 parts of p-toluenesulfonamide and 640 parts of 37% aqueous formaldehyde the pH of which had been previously adjusted to 6.0 with potassium acid phthalate and sodium hydroxide. With continuous agitation the reaction mixture was heated to reflux temperature over a period of 40 minutes and the refluxing continued for a period of 15 minutes. At this point the reaction mixture was allowed to cool and the water decanted from the resin. The resin was washed 3 times with warm water and finally dehydrated in vacuum at 30–50 mm. pressure, using a maximum flask temperature of 90° C. to yield 1245 parts of water-white resinous solid.

In examples 11 to 15 inclusive, the ammonia derivative can be replaced by other materials which have a >NH group with the free valences being filled by hydrogen or carbon atoms. This therefore includes amides and primary and secondary amines such as the ureas, thioureas, melamines, sulfonamides, and alkyl-substituted derivatives thereof. It is only necessary that the material be capable of condensing with an aldehyde.

The second class of condensates suitable for modifying the compositions herein described are those which contain reactive phenolic hydroxyl groups formed by the reaction of phenols and aldehydes. Phenol and formaldehyde react to form a variety of reaction products depending upon the proportions and conditions of reaction. These include products such as phenol alcohols having both phenolic and alcoholic hydroxyl groups, and products of the diphenol-methane type containing phenolic hydroxyl groups only. The condensation of phenol and formaldehyde can be carried out with the use of acid or alkaline condensing agents and in some cases by first combining the aldehyde with an alkali such as ammonia to form hexamethylenetetramine and reacting the latter with the phenol. The phenol-aldehyde resins at an initial or intermediate stage of reaction are intended to be included in the term phenol-aldehyde condensates as used herein.

In general, the phenol-aldehyde condensates should not have their condensation carried so far as to become insoluble and nonreactive. It is preferred in the preparation of the instant compositions that they be used at an intermediate stage or at a stage of reaction such that they contain reactive phenolic hydroxyl groups or both phenolic and alcoholic hydroxyl groups. This is desirable in order to permit a proper blending of the phenol-aldehyde condensate with the polyepoxides and diphenol carboxylic acid for subsequent reaction therewith.

The phenol-aldehyde condensates may be derived from mononuclear phenols, polynuclear phenols, monohydric phenols, or polyhydric phenols. The critical requirement for the condensate is that it be compatible with the polyepoxides and diphenol carboxylic acids or with the two reactants in a solvent used as a reaction medium. The phenol-aldehyde condensate which is essentially a polymethylol phenol rather than a polymer may be used in the preparation of the new phenol-aldehyde, polyepoxide, diphenol carboxylic acid products, or it may be used after further condensation, in which case some of the methylol groups are usually considered to have disappeared in the process of condensation. Various so-called phenolic resins which result from the reaction of phenols and aldehydes, and particularly from common phenols or cresols and formaldehyde, are available as commercial products both of an initial and intermediate character. Such products include resins which are readily soluble in common solvents or readily fusible so that they can be admixed with the epoxides and diphenol carboxylic acid and reacted therewith to form the products of this invention.

In selecting a phenol-aldehyde condensate one may choose either the heat-converting or the permanently fusible type. For example, the formaldehyde reaction products of such phenols as carbolic acid, resorcinal, and 2,2-bis(4-hydroxyphenyl)propane readily convert to infusible, insoluble compositions on the application of heat. On the other hand, some of the para alkylated phenols, as illustrated by p-tert-butylphenol, produce permanently fusible resins on reaction with formaldehyde. Even though fusible condensates are employed, however, insoluble, infusible products result when they are heated in combination with the epoxides and the diphenol carboxylic acid described.

Examples 16 to 18, inclusive, describe the preparation of some of the operable phenol-aldehyde condensates which may be used in combination wtih the polyepoxides and diphenol carboxylic acids to form the products herein described. It is to be noted that the three examples are drawn from distinct classes of phenols and are meant to be representative of the broad class of phenols. Thus, in Example 16, the phenol is a dihydroxy dinuclear phenol, in Example 17 an alkyl-substituted phenol, and in Example 18 a simple phenol. The examples, therefore, illustrate the unsubstituted monohydric phenols, the substituted monohydric phenols, and the polynuclear phenols.

Example 16

In a 3-liter 3-neck flask provided with a mechanical agitator, a thermometer, and a reflux condenser was placed 912 parts of Bisphenol A, 960 parts of 37% aqueous formaldehyde, and 2.3 parts of oxalic acid. With continuous agitation, the reaction mixture was heated to the reflux temperature and refluxing continued for a period of 1 hour. After permitting the reaction mixture to cool to around 50° C. the water layer was removed by decantation. The phenol-formaldehyde layer was then washed three times with water which in each case was removed by decantation. The last portion of water was removed by distillation at reduced pressure using a water aspirator system which gave pressure around 30–40 mm. The temperature during the removal of this last portion of water ranged from 70–90° C. The product, amounting to 1065 parts, was a clear, heavy, syrupy material.

Example 17

The procedure of preparation, including the dehydration step, was the same as that used in Example 16. A mixture of 1000 parts of p-tert-butyl-phenol, 1067 parts of 37% aqueous formaldehyde, and 10 parts of sodium hydroxide was used to give a final yield of 1470 parts of a clear, almost colorless syrupy product.

Example 18

Again a reaction procedure including the dehydration step, was the same as that used in Example 16. A mixture of 658 parts of phenol, 1400 parts of 37% aqueous formaldehyde, and 6.6 parts of sodium hydroxide was used to give a final yield of 1168 parts of a clear, syrupy product.

In Examples 11 to 18 inclusive, the aldehyde can be replaced by other mono-aldehydes including acetaldehyde, propionaldehyde, n, butyraldehyde, inbutyraldehyde, valeraldehyde, capronaldehyde, heptaldehyde as well as the more complex aldehydes such as furfural.

In Examples 16 to 18 inclusive, the phenol can be replaced by other phenols including ortho, meta, and para cresol, 2,4 xylenol, 3,4 xylenol, 2,5 xylenol, 3,5 xylenol, 2,5 dibutyl phenol, p-phenyl phenol, 2 ethyl phenol p-cyclohexylphenol, 3 isopropyl phenol and p-tert-amyl-phenol.

GENERAL REACTION CONDITIONS AND CHARACTERISTICS OF THE NEW COMPOSITIONS

In making the new compositions, the polyepoxide and diphenol carboxylic acid or such compositions modified with aldehyde condensates are admixed in suitable proportions and reaction will proceed merely by the application of heat. More specifically the reaction is effected by heating the mixtures at elevated temperatures, usually in the range of about 75–250° C. Catalysts are unnecessary, but in certain cases it may be desirable to speed up the reaction by the use of catalysts, such as boron trifluoride adducts, sodium phenoxides, and mineral acid type catalysts.

The reaction mixtures and final reaction products of this invention may be prepared by using varying ratios of epoxide to diphenol carboxylic acid. The quantities of reactants employed in a given instance will depend upon the characteristics desired in the final product. Flexible conversion products can be obtained from the proper selection of epoxide, diphenol carboxylic acid, and phenolaldehyde condensate. In general, operable products are those in which the ratio of epoxide to diphenol carboxylic acid on an equivalent weight basis ranges from about 6:1 to 1:6 with the preferred range, because of the general over-all characteristics, being from 2:1 to 1:2. In instances where an aldehyde condensate is used as a modifier, operable amounts on a weight basis of the combined epoxide and diphenol carboxylic acid range up to about 90%, but from a practical standpoint, the preferred percentage is about 10% to 35%.

Compositions containing the polyepoxides and the diphenol carboxylic acids or such compositions modified with aldehyde condensates may be used as mixtures or at varying intermediate stages of reaction. The initial mixtures or intermediate reaction products which are soluble in common organic solvents may be blended in solution in proper proportions and the solutions then applied as an impregnant for fabrics or paper, or for the formation of protective coating films. Subsequent heating functions to remove the solvent and bring about polymerization to the insoluble, infusible state. For other uses, the initial or intermediate mixture may be used without a solvent, giving directly a composition which, on the application of heat, converts to an infusible, insoluble final product.

In making the new compositions and products herein described, the polyepoxides and the diphenol carboxylic acid or such compositions modified with aldehyde condensates may be used in regulated proportions without the addition of other materials. For certain uses, other components are often advantageously added, including filling and compounding materials, plasticizers, pigments, etc. Compositions which tend to give somewhat brittle products on conversion to the insoluble, infusible state are advantageously compounded with plasticizers. For most applications, it is possible to obtain suitable flexibility and toughness by regulating the proportions and types of reacting ingredients, thereby obviating the need for plasticizers.

The application of heat to the mixtures herein set forth may involve several chemical reactions. It will be appreciated that the reactions involved are very complex and the extent to which each takes place will vary with the temperature used in heat treating, the period of time therefor, and with the particular types of polyepoxides, aldehyde condensate, if used, and diphenol carboxylic acid chosen. While it is not desired to be limited by any theoretical explanation of the exact nature of these reactions, it seems probable that conversion to the final polymeric products is accompanied by direct polymerization of the epoxide groups inter se; reaction of the epoxide groups with methylol hydroxyl groups; reaction of the epoxide groups with phenolic hydroxyl groups, and reaction of epoxide groups with active hydrogen attached to a nitrogen atom, all of which take place to some extent simultaneously in forming the final products.

The present invention provides a wide range of reaction compositions and products including initial mixtures of the polyepoxides, aldehyde condensates, and the diphenol carboxylic acids, partial or intermediate reaction products of such mixtures and compositions containing such intermediate reaction products as well as final reaction products. In general, the initial mixtures, as well as the intermediate reaction products unless too highly polymerized, are soluble in solvents of the lacquer type, such as ketone or ester solvents.

In addition to having outstanding physical properties, such as hardness, toughness, and flexibility, the final infusible, insoluble products have outstanding chemical properties, such as high resistance to oxidation, water, alkali, acids and organic solvents. It has also been observed that the final conversion products possess unusually good adhesion to most surfaces including metal, glass, wood, and plastics. This property of outstanding adhesion to a wide variety of surfaces gives the subject products high potential value for use in formulating adhesives. This property is also of extreme value in formulating protective coating films for use on many types of surfaces. The adhesion characteristics are probably due to the fact that even in the converted, infusible state, the compositions contain a relatively high percentage of highly polar groups, such as ether groups, ester groups, and alcoholic and phenolic hydroxyl groups. Despite the high percentage of polar groups in the insoluble, infusible products of this invention the tolerance for water is unusually low, apparently due to the high molecular weight and rigid cross-linked structure of the final compositions.

EXPERIMENTAL

Examples 19 to 156, inclusive, illustrate the preparation of insoluble, infusible protective coating films from the compositions of this invention. In the preparation of the composition for heat curing to form the protective coating films, each of the diphenol carboxylic acids and the polyepoxides with the exception of epoxidized polyesters were dissolved in methyl ethyl ketone to a nonvolatile content of 40–60%. The epoxidized polyesters were used at the nonvolatile and in the solvent in which they were prepared. The aldehyde condensates were dissolved in a mixture of methyl ethyl ketone and butanol to a nonvolatile content of 40–60%. Mixtures of the diphenol carboxylic acids and polyepoxides or such compositions modified with aldehyde condensates were found to be stable for extended periods of time at normal temperatures. Mixtures of the solutions were spread on panels with a .002″ Bird applicator and the films were baked for periods of 30 to 90 minutes at temperatures ranging from 150–200° C. Proportions as used in the following table refer to parts by weight and are based on the nonvolatile content of the solutions of reactants.

In a number of examples set out in the following table catalysts are employed to accelerate the reaction. In the table the catalyst used is designated by a letter corresponding to the following key:

A = $BF_3$—$Et_2O$
B = $NaOCH_3$ in methyl alcohol
C = $NaOCH_2CH_3$ in ethyl alcohol
D = Sodium salt of 4,4-bis(4-hydroxyphenyl)pentanoic acid
E = Sodium phenate

| Example No. | Polyepoxide | Parts | Aldehyde condensate | Parts | Diphenolic acid | Parts | Catalyst Type | Catalyst Parts | Conversion Time (hrs.) | Conversion Temp. (° C.) | Film resistance $H_2O$ at (100° C.) | Film resistance Hours 5% aqueous NaOH (at 25° C.) |
|---|---|---|---|---|---|---|---|---|---|---|---|---|
| 19 | Epon 864 | 280 | | | Ex. 1 | 76.2 | C | 1.52 | 0.5 | 175 | 35+ | 76+ |
| 20 | do | 280 | | | Ex. 1 | 76.2 | D | 10.4 | .5 | 175 | 35+ | 76+ |
| 21 | do | 26.3 | | | Ex. 1 | 2.0 | C | .14 | .5 | 175 | .12 | 2 |
| 22 | do | 26.3 | | | Ex. 1 | 14.3 | C | .14 | .5 | 175 | .25 | 55 |
| 23 | Epon 1001 | 37.5 | | | Ex. 1 | 7.2 | E | .45 | .5 | 185 | 12+ | 76+ |
| 24 | do | 37.5 | | | Ex. 1 | 7.2 | C | .09 | .5 | 185 | 35+ | 76+ |
| 25 | do | 37.5 | | | Ex. 1 | 7.2 | D | 1.2 | .5 | 175 | 35+ | 76+ |
| 26 | do | 37.5 | | | Ex. 1 | 4.0 | D | 1.2 | .5 | 175 | 22+ | 55+ |
| 27 | Epon 1004 | 67.5 | | | Ex. 1 | 7.2 | C | .14 | .5 | 175 | 35+ | 76+ |
| 28 | do | 67.5 | | | Ex. 1 | 7.2 | D | 1.1 | .5 | 185 | 35+ | 76+ |
| 29 | do | 67.5 | | | Ex. 1 | 14.3 | D | 1.0 | .5 | 175 | .33 | 7.25 |
| 30 | Epon 1007 | 350 | | | Ex. 1 | 23.2 | C | 1.82 | .5 | 185 | 21 | 76+ |
| 31 | do | 350 | | | Ex. 1 | 23.2 | D | 2.52 | .5 | 175 | .35 | 76+ |
| 32 | do | 35 | | | Ex. 1 | 5.7 | C | .03 | .5 | 175 | .25 | 55 |
| 33 | Epon 1009 | 300 | | | Ex. 1 | 9.5 | C | .91 | .5 | 175 | 7.5 | 76+ |
| 34 | do | 300 | | | Ex. 1 | 9.5 | D | 1.26 | .5 | 185 | 17 | 28 |
| 35 | do | 30 | | | Ex. 1 | 4.9 | C | .02 | .5 | 175 | .5 | 32 |
| 36 | Ex. 9 | 113 | | | Ex. 1 | 72 | | | .5 | 185 | 3 | .33 |
| 37 | Ex. 9 | 113 | | | Ex. 1 | 72 | | | .5 | 175 | 2 | .33 |
| 38 | Ex. 9 | 113 | | | Ex. 1 | 40 | | | .5 | 185 | 4 | .2 |
| 39 | Ex. 10 | 394 | | | Ex. 1 | 19.1 | | | 1.25 | 185 | 8 | .5 |
| 40 | Ex. 10 | 394 | | | Ex. 1 | 19.1 | D | 3.08 | .5 | 175 | 3 | .8 |
| 41 | Ex. 10 | 394 | | | Ex. 1 | 19.1 | C | .68 | .5 | 175 | 2 | .8 |
| 42 | Ex. 10 | 394 | | | Ex. 1 | 19.1 | D | 1.54 | .5 | 175 | 6.75 | .8 |
| 43 | Ex. 10 | 394 | | | Ex. 1 | 19.1 | D | 1.54 | .5 | 185 | 6.75 | .8 |
| 44 | Ex. 10 | 394 | | | Ex. 1 | 19.1 | C | .34 | .5 | 175 | 6.75 | .5 |
| 45 | Ex. 10 | 394 | | | Ex. 1 | 19.1 | C | .34 | .5 | 185 | 7.00 | .8 |
| 46 | Ex. 5 | 191 | | | Ex. 1 | 72 | A | 3.8 | .5 | 200 | 5.5 | |
| 47 | Ex. 5 | 191 | | | Ex. 1 | 72 | A | 5.7 | .5 | 185 | 3.5 | |
| 48 | Ex. 5 | 191 | | | Ex. 1 | 143 | A | 5.3 | .5 | 200 | .25 | |
| 49 | Ex. 5 | 191 | | | Ex. 1 | 40 | A | 5.3 | .5 | 200 | 3 | |
| 50 | Ex. 6 | 278 | | | Ex. 1 | 72 | A | 5.5 | .5 | 200 | 17 | |
| 51 | Ex. 6 | 278 | | | Ex. 1 | 72 | A | 8.3 | .5 | 185 | 18.5 | |
| 52 | Ex. 6 | 278 | | | Ex. 1 | 214 | A | 5.5 | .5 | 200 | .12 | |
| 53 | Ex. 6 | 278 | | | Ex. 1 | 20 | A | 11 | .5 | 200 | 6 | |
| 54 | Ex. 7 | 291 | | | Ex. 1 | 95.5 | A | 5.8 | .5 | 200 | 13 | |
| 55 | Ex. 7 | 291 | | | Ex. 1 | 95.5 | A | 8.7 | .5 | 185 | 13 | |
| 56 | Ex. 7 | 219 | | | Ex. 1 | 20 | A | 6.3 | .5 | 185 | .5 | |
| 57 | Ex. 7 | 219 | | | Ex. 1 | 57 | A | 5.8 | .5 | 200 | 3 | |
| 58 | Epon 1001 | 1.0 | | | Ex. 2 | 1 | A | .3 | .5 | 200 | .33 | 2 |
| 59 | Epon 562 | .5 | | | Ex. 2 | 1.5 | A | .2 | .5 | 200 | .75 | |
| 60 | Epon 1004 | 1.0 | | | Ex. 4 | .5 | B | .05 | 1.0 | 200 | 1 | 20 |
| 61 | Epon 1001 | 2.0 | | | Ex. 3 | .5 | A | .2 | .5 | 200 | 3 | 100+ |
| 62 | Epon 1004 | 1.0 | Ex. 18 | 1.0 | Ex. 2 | 1.0 | B | .07 | .5 | 200 | 11 | 28 |
| 63 | Epon 1001 | 1.0 | Ex. 16 | 1.0 | Ex. 4 | .5 | B | .05 | .5 | 200 | .75 | 21 |

| Example No. | Polyepoxide | Parts | Aldehyde condensate | Parts | Diphenolic acid | Parts | Catalyst Type | Catalyst Parts | Conversion Time (hrs.) | Conversion Temp. (°C.) | Film resistance H₂O at (100° C.) | Film resistance Hours 5% aqueous NaOH (at 25° C.) |
|---|---|---|---|---|---|---|---|---|---|---|---|---|
| 64 | Epon 562 | 2.0 | Ex. 17 | 1.0 | Ex. 4 | 1.0 | B | .07 | .5 | 200 | .33 | .33 |
| 65 | Epon 1001 | .5 | Ex. 17 | 1.0 | Ex. 3 | 1.0 | B | .03 | .5 | 200 | 1 | .33 |
| 66 | Epon 562 | .5 | Ex. 11 | .5 | Ex. 2 | 1.5 | B | .05 | .5 | 200 | 3 | 1 |
| 67 | Epon 1001 | .5 | Ex. 15 | .25 | Ex. 2 | 1.0 | B | .03 | 1.0 | 200 | 5 | 20 |
| 68 | Epon 1004 | 1.0 | Ex. 12 | 1.0 | Ex. 4 | 1.0 | B | .06 | .5 | 200 | .5 | 1.5 |
| 69 | Epon 1001 | 1.0 | Ex. 11 | 1.0 | Ex. 4 | 1.5 | B | .07 | .5 | 200 | .5 | .2 |
| 70 | Epon 1004 | .25 | Ex. 11 | .75 | Ex. 3 | 1.0 | B | .03 | 1.0 | 200 | .75 | .25 |
| 71 | Epon 562 | .5 | Ex. 15 | 2.0 | Ex. 3 | 1.0 | B | .06 | .5 | 200 | 10 | 1 |
| 72 | Epon 864 | 280 | Ex. 11 | 280 | Ex. 1 | 76 | C | 1.44 | .5 | 185 | 20 | 90 |
| 73 | Epon 1001 | 250 | Ex. 11 | 125 | Ex. 1 | 47.5 | C | .6 | .5 | 185 | 20 | 90 |
| 74 | Epon 1004 | 250 | Ex. 11 | 125 | Ex. 1 | 13.2 | C | .5 | .5 | 185 | 20 | 90 |
| 75 | Epon 1007 | 175 | Ex. 11 | 175 | Ex. 1 | 9.5 | C | .18 | .5 | 185 | 20 | 90 |
| 76 | Epon 1009 | 250 | Ex. 11 | 250 | Ex. 1 | 3.95 | C | .14 | .5 | 185 | 20 | 90 |
| 77 | Epon 864 | 250 | Ex. 12 | 125 | Ex. 1 | 33.8 | C | 1.29 | .5 | 185 | 20 | 90 |
| 78 | Epon 1001 | 250 | Ex. 12 | 250 | Ex. 1 | 47.5 | C | .6 | .5 | 185 | 0.83 | 90 |
| 79 | Epon 1004 | 250 | Ex. 12 | 250 | Ex. 1 | 13.2 | C | .5 | .5 | 185 | 0.83 | 90 |
| 80 | Epon 1007 | 175 | Ex. 12 | 43.8 | Ex. 1 | 9.5 | C | .18 | .5 | 185 | 7.5 | 90 |
| 81 | Epon 1009 | 300 | Ex. 12 | 300 | Ex. 1 | 9.5 | C | .18 | .5 | 185 | 0.17 | 90 |
| 82 | do | 300 | Ex. 12 | 30 | Ex. 1 | 9.5 | C | 15.0 | .5 | 175 | 4.5 | 16 |
| 83 | Epon 864 | 280 | Ex. 13 | 70 | Ex. 1 | 76.0 | C | 1.44 | .5 | 185 | 20 | 90 |
| 84 | Epon 1001 | 250 | Ex. 13 | 250 | Ex. 1 | 23.8 | C | .9 | .5 | 185 | 20 | 90 |
| 85 | Epon 1004 | 270 | Ex. 13 | 270 | Ex. 1 | 28.5 | C | .56 | .5 | 185 | 20 | 90 |
| 86 | Epon 1007 | 250 | Ex. 13 | 62.3 | Ex. 1 | 3.4 | C | .25 | .5 | 185 | 20 | 90 |
| 87 | Epon 1009 | 250 | Ex. 13 | 125 | Ex. 1 | 3.9 | C | .15 | .5 | 185 | 20 | 90 |
| 88 | Epon 864 | 250 | Ex. 14 | 250 | Ex. 1 | 33.8 | C | 1.29 | .5 | 185 | 20 | 90 |
| 89 | Epon 1001 | 250 | Ex. 14 | 125 | Ex. 1 | 12.0 | C | .9 | .5 | 185 | 20 | 90 |
| 90 | Epon 1004 | 270 | Ex. 14 | 135 | Ex. 1 | 28.5 | C | .56 | .5 | 185 | 20 | 90 |
| 91 | Epon 1007 | 250 | Ex. 14 | 250 | Ex. 1 | 6.87 | C | .25 | .5 | 185 | 20 | 90 |
| 92 | Epon 1009 | 300 | Ex. 14 | 150 | Ex. 1 | 9.5 | C | .18 | .5 | 185 | 20 | 90 |
| 93 | Epon 864 | 280 | Ex. 15 | 280 | Ex. 1 | 76.0 | C | 1.52 | .5 | 185 | 7 | 140 |
| 94 | Epon 1001 | 250 | Ex. 15 | 250 | Ex. 1 | 47.5 | C | .6 | .5 | 185 | 5 | 140 |
| 95 | Epon 1004 | 270 | Ex. 15 | 270 | Ex. 1 | 28.5 | C | .56 | .5 | 185 | 0.17 | 140 |
| 96 | Epon 1007 | 175 | Ex. 15 | 175 | Ex. 1 | 9.5 | C | .18 | .5 | 185 | 0.33 | 140 |
| 97 | Epon 1009 | 300 | Ex. 15 | 300 | Ex. 1 | 9.5 | C | .18 | .5 | 185 | 0.08 | 23 |
| 98 | Ex. 5 | 199 | Ex. 11 | 199 | Ex. 1 | 72.0 | | | .5 | 200 | 2.5 | 38 |
| 99 | Ex. 5 | 199 | Ex. 12 | 50 | Ex. 1 | 40 | A | 4.3 | .5 | 200 | 6.5 | 8 |
| 100 | Ex. 5 | 199 | Ex. 13 | 99 | Ex. 1 | 40 | A | 3.8 | .5 | 200 | 2.5 | 38 |
| 101 | Ex. 5 | 199 | Ex. 14 | 50 | Ex. 1 | 72 | A | 3.8 | .5 | 200 | 1.0 | 4.5 |
| 102 | Ex. 5 | 199 | Ex. 15 | 50 | Ex. 1 | 72 | A | 5.3 | .5 | 200 | 16+ | 0.25 |
| 103 | Ex. 6 | 249 | Ex. 11 | 125 | Ex. 1 | 20 | A | 6.3 | .5 | 185 | 2.5 | 3.5 |
| 104 | Ex. 6 | 249 | Ex. 12 | 249 | Ex. 1 | 72 | A | 4.3 | .5 | 200 | 7.0 | .4 |
| 105 | Ex. 6 | 249 | Ex. 13 | 31 | Ex. 1 | 20 | A | 8.0 | .5 | 200 | .8 | .5 |
| 106 | Ex. 6 | 249 | Ex. 14 | 31 | Ex. 1 | 20 | A | 8.0 | .5 | 200 | .8 | 1.5 |
| 107 | Ex. 6 | 249 | Ex. 15 | 125 | Ex. 1 | 20 | A | 10.0 | .5 | 200 | 16+ | 0.25 |
| 108 | Ex. 7 | 219 | Ex. 11 | 55 | Ex. 1 | 57 | A | 4.0 | .5 | 200 | 2+ | 2.5 |
| 109 | Ex. 7 | 219 | Ex. 12 | 28 | Ex. 1 | 57 | A | 4.2 | .5 | 200 | .5+ | 2.5 |
| 110 | Ex. 7 | 219 | Ex. 13 | 219 | Ex. 1 | 72 | A | 2.6 | .5 | 200 | 2 | 4.5 |
| 111 | Ex. 7 | 219 | Ex. 14 | 110 | Ex. 1 | 57 | A | 3.3 | .5 | 200 | 16+ | 0.25 |
| 112 | Ex. 7 | 219 | Ex. 15 | 164 | Ex. 1 | 40 | A | 5.8 | 1.0 | 200 | 16+ | 0.25 |
| 113 | Ex. 9 | 150 | Ex. 11 | 150 | Ex. 1 | 95 | C | 1.8 | .5 | 185 | 27 | 0.67 |
| 114 | Ex. 9 | 150 | Ex. 11 | 150 | Ex. 1 | 95 | C | 1.8 | .5 | 185 | 15 | 2.5 |
| 115 | Ex. 9 | 150 | Ex. 12 | 150 | Ex. 1 | 47.5 | C | 1.8 | .5 | 185 | 27 | 3.75 |
| 116 | Ex. 9 | 150 | Ex. 13 | 37.5 | Ex. 1 | 95 | C | 1.8 | .5 | 185 | 27 | 0.75 |
| 117 | Ex. 9 | 150 | Ex. 14 | 75 | Ex. 1 | 23.75 | C | 1.8 | .5 | 185 | 27 | 39 |
| 118 | Ex. 9 | 150 | Ex. 15 | 150 | Ex. 1 | 95 | C | 1.8 | .5 | 185 | 27 | 0.12 |
| 119 | Ex. 10 | 394 | Ex. 11 | 197 | Ex. 1 | 23.75 | C | 1.8 | .5 | 185 | 27 | 7.5 |
| 120 | Ex. 10 | 394 | Ex. 12 | 394 | Ex. 1 | 190 | C | 1.8 | .5 | 185 | 27 | 1.75 |
| 121 | Ex. 10 | 394 | Ex. 13 | 394 | Ex. 1 | 95 | C | 1.8 | .5 | 185 | 27 | 34 |
| 122 | Ex. 10 | 394 | Ex. 14 | 46 | Ex. 1 | 190 | C | 1.8 | .5 | 185 | 27 | 4 |
| 123 | Ex. 10 | 394 | Ex. 15 | 197 | Ex. 1 | 95 | C | 1.8 | .5 | 185 | 27 | .13 |
| 124 | Epon 864 | 35 | Ex. 16 | 8.77 | Ex. 1 | 4.75 | C | .18 | .5 | 175 | 11+ | 114+ |
| 125 | Epon 1001 | 250 | Ex. 16 | 62.5 | Ex. 1 | 47.5 | C | .6 | .5 | 185 | 11+ | 114+ |
| 126 | Epon 1004 | 270 | Ex. 16 | 270 | Ex. 1 | 28.5 | C | .56 | .5 | 185 | 2.5 | 140 |
| 127 | do | 45 | Ex. 16 | 5.61 | Ex. 1 | 2.4 | C | .09 | .5 | 185 | 1.5+ | 114+ |
| 128 | Epon 1007 | 175 | Ex. 16 | 175 | Ex. 1 | 95 | C | .18 | .5 | 185 | 1.25 | 40 |
| 129 | do | 175 | Ex. 16 | 87.5 | Ex. 1 | 95 | C | .18 | .5 | 185 | .83 | 114+ |
| 130 | Epon 864 | 280 | Ex. 17 | 270 | Ex. 1 | 28.5 | C | 1.52 | .5 | 185 | 16+ | 140+ |
| 131 | do | 280 | Ex. 17 | 140 | Ex. 1 | 76 | C | 1.52 | .5 | 175 | 11+ | 114+ |
| 132 | Epon 1001 | 250 | Ex. 17 | 250 | Ex. 1 | 47.5 | C | .6 | .5 | 185 | 16+ | 140+ |
| 133 | do | 50 | Ex. 17 | 25 | Ex. 1 | 2.4 | C | .18 | .5 | 185 | 6+ | 114+ |
| 134 | Epon 1004 | 270 | Ex. 17 | 270 | Ex. 1 | 28.5 | C | .56 | .5 | 185 | 16+ | 140+ |
| 135 | Epon 1007 | 175 | Ex. 17 | 175 | Ex. 1 | 9.5 | C | .18 | .5 | 185 | 16+ | 140+ |
| 136 | do | 43.75 | Ex. 17 | 5.44 | Ex. 1 | .63 | C | .04 | .5 | 185 | 1.5+ | 114+ |
| 137 | Epon 1009 | 300 | Ex. 17 | 300 | Ex. 1 | 9.5 | C | .18 | .5 | 185 | 16+ | 140+ |
| 138 | do | 300 | Ex. 17 | 37.5 | Ex. 1 | 9.5 | C | .18 | .5 | 175 | 6+ | 114+ |
| 139 | Epon 1004 | 270 | Ex. 18 | 33.7 | Ex. 1 | 28.5 | C | .56 | .5 | 185 | 3 | 114+ |
| 140 | Epon 1009 | 75 | Ex. 18 | 37.5 | Ex. 1 | .34 | C | .04 | .5 | 175 | 1 | 114+ |
| 141 | Ex. 5 | 191 | Ex. 18 | 199 | Ex. 1 | 72 | A | 5.3 | .5 | 200 | 6+ | 5.5 |
| 142 | Ex. 5 | 191 | Ex. 18 | 99 | Ex. 1 | 72 | A | 5.3 | .5 | 200 | 6 | 1.5 |
| 143 | Ex. 5 | 191 | Ex. 18 | 50 | Ex. 1 | 72 | C | 5.3 | .5 | 200 | 9.5+ | 7+ |
| 144 | Ex. 5 | 191 | Ex. 16 | 99 | Ex. 1 | 42 | C | 5.3 | .5 | 200 | 6.5+ | 10+ |
| 145 | Ex. 6 | 278 | Ex. 18 | 209 | Ex. 1 | 72 | C | 11 | .5 | 200 | 9.5+ | 0.75 |
| 146 | Ex. 6 | 249 | Ex. 17 | 35 | Ex. 1 | 20 | C | 3 | .5 | 200 | 14.5+ | 6.5+ |
| 147 | Ex. 7 | 219 | Ex. 17 | 110 | Ex. 1 | 72 | A | 5.8 | .5 | 200 | 0.17 | 2.5 |
| 148 | Ex. 7 | 219 | Ex. 16 | 164 | Ex. 1 | 20 | C | 2 | .5 | 200 | 14.5+ | 14.5+ |
| 149 | Ex. 7 | 219 | Ex. 18 | 164 | Ex. 1 | 57 | A | 5.8 | .5 | 200 | 6 | 2 |
| 150 | Ex. 7 | 219 | Ex. 16 | 219 | Ex. 1 | 57 | C | 5.8 | .5 | 200 | 9.5+ | 4+ |
| 151 | Ex. 9 | 150 | Ex. 17 | 150 | Ex. 1 | 95 | | | .5 | 185 | 30+ | 8.5 |
| 152 | Ex. 9 | 150 | Ex. 16 | 37.5 | Ex. 1 | 95 | | | .5 | 185 | 30+ | |
| 153 | Ex. 9 | 150 | Ex. 18 | 150 | Ex. 1 | 8.0 | | | .5 | 185 | 30+ | 28 |
| 154 | Ex. 10 | 394 | Ex. 17 | 394 | Ex. 1 | 95 | | | .5 | 185 | 10+ | 50+ |
| 155 | Ex. 10 | 394 | Ex. 16 | 197 | Ex. 1 | 47.5 | | | .5 | 185 | 30+ | 8.5 |
| 156 | Ex. 10 | 394 | Ex. 18 | 394 | Ex. 1 | 190 | | | .5 | 185 | 7.5+ | 50 |

*Example 157*

A reaction mixture was prepared by admixing 260 parts of the phenol-aldehyde condensate of Example 17, 262 parts Example 8, 95 parts 4,4-bis(4-hydroxyphenyl) pentanoic acid, and 15.8 parts boron trifluoride triethanolamine complex. The aldehyde condensate and Admex 710 were used as 50% nonvolatile methyl ethyl ketone solutions and the acid was used as a 50% nonvolatile dioxane solution. The mixture was spread on glass panels in wet films of .002" thickness, and cured by heating at 200° C. for 30 minutes. The cured films were hard, tack-free, and flexible, and they withstood aqueous 5% sodium hydroxide for 24 hours.

*Example 158*

A reaction mixture was prepared by admixing 350 parts of Epon 864, 20 parts of the phenol-aldehyde condensate of Example 17, 381 parts of 4,4-bis(4-hydroxyphenyl) pentanoic acid, and 15 parts sodium ethoxide catalyst. The mixture was spread in wet films of .002" thickness. Hard, tack-free, infusible brittle films were obtained by curing the wet films at 175° C. for one hour.

*Example 159*

A reaction mixture was prepared by admixing 35 parts of Epon 864, 360 parts of the phenol-aldehyde condensate of Example 16, and 9.5 parts 4,4-bis(4-hydroxyphenyl) pentanoic acid. The mixture was spread in wet films of .002" thickness. Hard, tack-free, somewhat brittle, infusible films were obtained by curing the wet films at 175° C. for one hour.

*Example 160*

A reaction mixture was prepared by admixing 300 parts of the polyepoxide of Example 9, 10 parts of the aldehyde condensate of Example 17 and 64 parts of 4,4-bis(4-hydroxyphenyl) pentanoic acid. The mixture was spread in wet films of .002" thickness and the wet films were cured by heating at 175° C. for 30 minutes. The cured films were hard, flexible and tack-free. They withstood boiling water for 4½ hours and 5% sodium hydroxide for 1½ hours without deterioration.

*Example 161*

A reaction mixture was prepared by admixing 150 parts of the polyepoxide of Example 9, 60 parts of the aldehyde condensate of Example 17 and 95 parts of 4,4-bis(4-hydroxyphenyl) pentanoic acid. The mixture was spread in wet films of .002" thickness and cured by heating at 175° C. for 30 minutes. The cured films were hard, flexible and tack-free. They withstood boiling water for 4½ hours and 5% sodium hydroxide for 1½ hours without deterioration.

*Example 162*

A reaction mixture was prepared by admixing 350 parts of Epon 864, 3600 parts of the condensate of Example 11, 95 parts 4,4-bis(4-hydroxyphenyl) pentanoic acid, and 10 parts sodium ethoxide. The mixture was spread in wet films of .002" thickness and cured at 175° C. for 30 minutes. The cured films were hard, tack-free, and withstood boiling water for 5½ hours and 5% aqueous NaOH for 10½ hours.

*Example 163*

A reaction mixture was prepared by admixing 350 parts of Epon 864, 3600 parts of the condensate of Example 13, 95 parts 4,4-bis(4-hydroxyphenyl) pentanoic acid, and 10 parts sodium ethoxide. The mixture was spread in wet films of .002" thickness and cured by heating for 30 minutes at 175° C. The cured films were hard and tack-free. They withstood boiling water for 4½ hours and 5% aqueous NaOH for 10½ hours.

*Example 164*

A reaction mixture was prepared by admixing 3500 parts of Epon 864, 100 parts of the condensate of Example 15, 3800 parts 4,4-bis(4-hydroxyphenyl) pentanoic acid, and 100 parts sodium ethoxide. The mixture was spread in wet films of .002" thickness. Hard, tack-free films were obtained by heating the wet films for one hour at 175° C.

*Example 165*

A reaction mixture was prepared by admixing 30 parts of the polyepoxide polyester of Example 5, 300 parts of the condensate of Example 12, 9.5 parts 4,4-bis(4-hydroxyphenyl) pentanoic acid, and 1 part sodium ethoxide. The mixture was spread in wet films of .002" thickness. Hard, tack-free films were obtained by heating the wet films for 30 minutes at 175° C.

*Example 166*

A reaction mixture was prepared by admixing 273 parts of the polyepoxide polyester of Example 7, 10 parts of the condensate of Example 11, 286 parts 4,4-bis(4-hydroxyphenyl) pentanoic acid, and 15 parts sodium ethoxide. The mixture was spread in wet films of .002" thickness to provide hard, tack-free films by curing the wet films for 30 minutes at 175° C.

*Example 167*

A reaction mixture was prepared by admixing 300 parts of the polyepoxide of Example 9, 10 parts of the aldehyde condensate of Example 13, and 64 parts of 4,4-bis(4-hydroxyphenyl) pentanoic acid. The mixture was spread in wet films of .002" thickness and cured by heating for 30 minutes at 175° C. The cured films were hard, flexible, and tack-free. They withstood boiling water for 1½ hours and 5% sodium hydroxide for ¾ of an hour without deterioration.

*Example 168*

A reaction mixture was prepared by admixing 15 parts of the polyepoxide of Example 9, 350 parts of the aldehyde condensate of Example 11, and 9.5 parts of 4,4-bis(4-hydroxyphenyl) pentanoic acid. The mixture was spread in wet films of .002" thickness and the films cured by heating for 30 minutes at 175° C. The cured films were hard, flexible, and tack-free. They withstood boiling water for 4½ hours and 5% sodium hydroxide for 10 hours without deterioration.

*Example 169*

A reaction mixture was prepared by admixing 150 parts of the polyepoxide of Example 9, 40 parts of the aldehyde condensate of Example 12, and 190 parts of 4,4-bis(4-hydroxyphenyl) pentanoic acid. The mixture was spread in wet films of .002" thickness and cured by heating for 30 minutes at 175° C. The cured films were hard, flexible, and tack-free. They withstood boiling water for 4½ hours and 5% sodium hydroxide for 2 minutes without deterioration.

It should be appreciated that the invention is not to be construed to be limited by the illustration examples. It is possible to produce still other embodiments without departing from the inventive concept herein disclosed. This application is a continuation-in-part of the Greenlee copending applications S. N. 541,022, 557,835, and 562,663, filed October 17, 1955, January 9, 1956, and February 1, 1956, respectively, now abandoned.

It is claimed and desired to secure by Letters Patent:

1. A composition of matter comprising the condensation product obtained by heating (A) an organic polyepoxide having an average of more than one epoxide group per molecule wherein the epoxy oxygen atom is linked to adjacent carbon atoms and (B) a 4,4-bis(hydroxyaryl)pentanoic acid wherein the hydroxyaryl radical is a member of the group consisting of unsubstituted hydroxyphenyl and ring substituted hydroxyphenyl wherein the hydroxy group of said member is in a position other than one meta to the point of attachment of said member to the pentanoic acid, any substituent on the hydroxyphenyl being a member selected from the group consisting of chloro, bromo, nitro and alkyl groups of from 1–5 carbon atoms and wherein the reactive oxirane groups of (A) and the reactive hydrogens of (B) are present in an equivalent ratio of from 6:1 to 1:6.

2. The composition of claim 1 wherein the reactive oxirane groups of (A) and the reactive hydrogens of (B) are present in an equivalent ratio of from about 2:1 to 1:2.

3. A composition of matter comprising the condensation product obtained by heating (A) an organic polyepoxide having an average of more than one epoxide oxirane groups of (A) and the reatcive hydrogens of group per molecule wherein the epoxy oxygen atom is linked to adjacent carbon atoms, (B) a 4,4-bis(hydroxyaryl)pentanoic acid wherein the hydroxyaryl radical is a member of the group consisting of unsubstituted hydroxyphenyl and ring substituted hydroxyphenyl wherein the hydroxy group of said member is in a position other than one meta to the point of attachment of said member to the pentanoic acid, any substituent on the hydroxyphenyl being a member selected from the group consisting of chloro, bromo, nitro and alkyl groups of from 1–5 carbon atoms and wherein the reactive oxirane groups of (A) and the reactive hydrogens of (B) are present in an equivalent ratio of from 6:1 to 1:6, and (C) from about 10–35% on a combined weight basis of (A) and (B) of a fusible condensate of a monoaldehyde with at least one organic ammonia derivative selected from the group consisting of urea, thiourea, melamine, toluene sulfonamide and alkyl substituted derivatives thereof.

4. A composition of matter comprising the condensation product obtained by heating (A) an organic polyepoxide having an average of more than one epoxide group per molecule wherein the epoxy oxygen atom is linked to adjacent carbon atoms, (B) a 4,4-bis(hydroxyaryl)pentanoic acid wherein the hydroxyaryl radical is a member of the group consisting of unsubstituted hydroxyphenyl and ring substituted hydroxyphenyl wherein the hydroxy group of said member is in a position other than one meta to the point of attachment of said member to the pentanoic acid, any substituent on the hydroxyphenyl being a member selected from the group consisting of chloro, bromo, nitro and alkyl groups of from 1–5 carbon atoms and wherein the reactive oxirane groups of (A) and the reactive hydrogens of (B) are present in an equivalent ratio of from 6:1 to 1:6, and (C) from about 10–35% on a combined weight basis of (A) and (B) of a fusible condensate of a monoaldehyde with a phenol.

5. The composition of claim 1 wherein the pentanoic acid is 4,4-bis(4-hydroxyphenyl) pentanoic acid.

6. The composition of claim 1 wherein the hydroxyaryl radical of the pentanoic acid is alkyl substituted.

7. The composition of claim 1 wherein said polyepoxide (A) is a complex epoxide which is a polymeric polyhydric alcohol having alternating aliphatic chains and aromatic nuclei united through ether oxygen and terminating in epoxy-substituted aliphatic chains.

8. The composition of matter of claim 1 wherein said polyepoxide (A) is an epoxidized polyester of tetrahydrophthalic acid and a glycol, wherein the epoxy oxygen atoms are each linked to adjacent carbon atoms in the nucleus of said acid.

9. The composition of matter of claim 1 wherein said polyepoxide (A) is an epoxidized ester of an unsaturated natural fatty oil acid containing about 15–22 carbon atoms, and having its reactive groups selected from the class consisting of oxirane and hydroxy.

10. The composition of matter of claim 1 wherein said polyepoxide (A) is an aliphatic polyepoxide selected from the group consisting of bis(glycidyloxy) butene, triglycidyl glyceryl ether, diepoxy butane, and diglycide ether.

References Cited in the file of this patent

UNITED STATES PATENTS 2,682,514    Newey _____ June 29, 1954

OTHER REFERENCES

Bader et al.: J.A.C.S., vol. 76, pages 4465–4466 (September 5, 1954). (Copy in Scientific Library.)

UNITED STATES PATENT OFFICE
Certificate of Correction

Patent No. 2,907,730                                                                  October 6, 1959

Sylvan Owen Greenlee

It is hereby certified that error appears in the printed specification of the above numbered patent requiring correction and that the said Letters Patent should read as corrected below.

Column 1, line 25, after "groups" strike out "or"; column 2, line 16, for "function" read —functional—; line 35, for "cabon" read —carbon—; line 53, for "witht" read —with—; line 64, for "impartred" read —imparted—; column 7, lines 14 to 17, in Equation V, for the glycerol formula reading

column 8, line 49, for "RR'$_s$N+OH—" read —RR'$_s$N+OH⁻—; column 9, line 19, Example 8, for "strokes" read —stokes—; column 10, line 23, for "derivatives" read —derivative—; columns 15 and 16, in the table, sixth column thereof, in the heading, for "Diphenolic acid" read —Diphenolic Acid—; columns 17 and 18, in the table, sixth column thereof, for "Diphenolic acid" read —Diphenolic Acid—; column 21, line 7, strike out "oxirane groups of (A) and the reatcive hydrogens of".

Signed and sealed this 17th day of May 1960.

[SEAL]

Attest:
KARL H. AXLINE,
*Attesting Officer.*

ROBERT C. WATSON,
*Commissioner of Patents.*